Patented Aug. 15, 1950

2,519,125

UNITED STATES PATENT OFFICE 2,519,125

PRODUCTION OF DICHLOROSTYRENE

Edwin R. Erickson, Oak Park, Ill., assignor to Mathieson Chemical Corporation, a corporation of Virginia No Drawing. Application December 31, 1945, Serial No. 638,579

1 Claim. (Cl. 260—650)

This invention relates to a method of treating halogenated organic compounds containing halogen on a side chain attached to an aromatic nucleus, which may or may not itself be halogenated, whereby all or a part of the halogen on the side chain is removed as hydrogen halide. In its most specific aspect, the invention is concerned with the dehydrochlorination of alpha and beta chloroethyl dichlorobenzenes with the production of dichlorostyrenes.

A host of materials have been proposed as catalysts for use in reactions of the above type. However, many of these while catalyzing the desired reaction also catalyze side reactions yielding difficultly separable by-products. Others are effective only at temperatures resulting in a major loss of starting material by thermal decomposition or in a major loss of product through polymerization. Still others are too costly for use on a commercial scale, either by reason of initial cost or because they are incapable of reactivation and re-use.

I have now discovered that asbestos is highly active as a dehydrohalogenation catalyst where the halogen to be removed is attached to a side chain of an aromatic nucleus. My discovery was made while I was testing the effectiveness of various dehydrohalogenation inhibitors in chloroethyl dichlorobenzenes at various temperatures and in the presence of various materials including materials known to be dehydrohalogenation catalysts. Each of the inhibitors effectively arrested dehydrochlorination in the case of these latter materials, but when the test was carried out with asbestos, the rate of hydrogen chloride evolution was substantially the same in the presence or absence of any inhibitor. I happened to test asbestos in this connection because of its use in gaskets, for example, with which chloroethyl dichlorobenzes are apt to come into contact during their separation from other materials by distillation. In such a distillation operation, dehydrochlorination of the chloroethyl dichlorobenzenes with production of dichlorostyrenes is highly undesirable because the dichlorostyrenes are prone to polymerize to viscouse polymers capable of plugging a distillation column rendering it inoperative. It is thus important that the distillation be effected in the absence of any material which tends to act as a dehydrohalogenation catalyst.

In the practice of my invention, commercial asbestos may be shredded and the shreds used as the catalytic material or shredded commercial asbestos paper may be reduced to a paste with water and easily dried pellets having about the size of the shot used in air rifles, for example, may be formed from the paste. If desired, promoters including alkaline earth metal halides such as magnesium chloride, calcium chloride and the like or oxides such as a mixture of zinc, chromium, and cobalt oxides may be used with the asbestos catalyst.

The temperature at which the asbestos catalyst is effective, other operating factors being assumed as constant, varies with the material subjected to the dehydrohalogenation treatment. In all cases it is best to effect the reaction under a subatmospheric pressure of less than 100 mm. of mercury absolute. In the dehydrochlorination of chloroethyl dichlorobenzenes to dichlorostyrenes, I find it advantageous to operate at temperatures between 300° C. and 400° C. and under a subatmospheric pressure of the order of 10–15 mm. of mercury absolute.

The asbestos catalyst is easily activated and reactivated by burning in a slow stream of air at temperatures of from 600° F. to 650° F. It is inactive with respect to hydrogen halides and does not promote the polymerization of polymerizable compounds. When employed in the production of dichlorostyrenes from chloroethyl dichlorobenzenes, the proportion of the chloroethyl dichlorobenzenes converted to dichlorostyrenes per pass over the catalyst is materially higher than in the case of catalysts heretofore employed in the reaction and since the reaction product contains only very minor amounts of compounds lower boiling than dichlorostyrenes a special distillation to remove such compounds either before or following separation of the dichlorostyrenes from the reaction product is seldom necessary. The product dichlorostyrenes are usually essentially free of objectionable color and materials which adversely affect the progress of polymerization reactions in which dichlorostyrenes are employed as reactants or the quality of the polymer product.

The reaction, with the catalyst in the form of shreds or pellets, for example, may be carried out in any suitable equipment. I generally employ one or a plurality of appropriately insulated tubes suitably packed with the catalyst. Although the compound to be dehydrohalogenated may initially contact the catalyst as a liquid, I prefer to completely vaporize the charge material before bringing it into contact with the catalyst. It is ordinarily most convenient to pre-heat the vapors to a temperature sufficiently high to maintain the catalyst at the desired operating temperatures. The catalyst-feed ratio may vary within wide limits but usually there is an optimum amount of catalyst which is easily determined by simple experimentation. Contact time may be substantially less than one second and in some instances may be even less than 0.1 second. I have found it advantageous to operate at the peak activity of the catalyst even where this necessitates reactivation of the catalyst at frequent intervals. Reactivation of the catalyst is conveniently effected in situ, but the catalyst may be removed for reactivation. Using a plurality of tubes, it is unnecessary to halt the operation for reactivation of the catalyst since one or more of the tubes may be left on stream while the catalyst in the remaining tube or tubes is subjected to reactivation treatment. Nitrogen, steam or other inert gas may be used to carry the vaporized charge over the catalyst if desired.

My invention is further illustrated by the following examples which are not to be taken as in any way limiting the scope thereof.

Example I

Commercial asbestos paper was shredded and made into a moist paste with water. The paste was pelleted and the pellets dried over night in an oven. Subsequently the pellets were activated by heating to about 600° C. in a combustion furnace through which a slow stream of air was caused to pass.

Betachloroethyl 2,6-dichlorobenzene was vaporized by heating to a temperature of 450° C. and the vapors passed over the catalyst held at a temperature of 350° C. The rate of liquid feed to the vaporizer was 0.75 ml. per minute. The entire operation was conducted under an absolute pressure of 11 mm. of mercury. The product of the dehydrochlorination had a refractive index of 1.5718 at 25° C. as compared with a refractive index of 1.5729 for highly purified 2,6-dichlorostyrene. This indicates a 90% conversion of the betachloroethyl dichlorobenzene feed. After the run the catalyst was readily reactivated by heating in the manner of the initial activation.

Of the twelve isomeric chloroethyldichlorobenzenes, betachloroethyl-2,6-dichlorobenzene is normally the most difficult to dehydrochlorinate to a dichlorostyrene.

Example II

Mixed chloroethyl dichlorobenzenes obtained by chlorinating ethyl benzene were vaporized and the vapors under a pressure of 13 mm. of mercury were passed over the catalyst of Example I maintained at a temperature of 300–320° C. The product of the dehydrochlorination showed a side chain chlorine content of 3.33%, and an iodine value of 105.7, indicating a conversion of 72% of the chloroethyl dichlorobenzenes charged.

On fractional distillation of the product material at 5 mm. pressure in the presence of about 0.5% of paranitrosophenol and 1% of alphanitroso betanaphthol to inhibit polymerization of the dichlorostyrenes and dehydrochlorination of unconverted chloroethyl dichlorobenzenes, dichlorostyrenes having refractive indices of from 1.5780–1.5518 and boiling points of 76–82° C. were obtained.

Example III

In this instance the charging rate was twice that of Examples I and II, namely, 1.5 ml. of liquid per minute and the catalyst temperature varied from 318 to 325° C. Samples of the product taken as the dehydrochlorination progressed showed refractive indices varying from 1.5781– 1.5768. The product had a side chain chlorine content of 3.5, and an iodine value of 105.4. The percentage conversion of the chloroethyl dichlorobenzenes was again 72%.

On distillation of the crude material in the presence of paranitrosophenol and alphanitroso betanapthol in the quantities used in the preceding example, dichlorostyrenes having refractive indices between 1.5780 and 1.5800 and boiling points of 76–80° C. at 4.5 mm. were realized.

Example IV

The chloroethyl dichlorobenzene mixture constituting the starting material in this run contained about 57.6% of alphachloroethyl dichlorobenzenes and 42.4% betachloroethyl dichlorobenzenes. The catalyst was that used in Examples I, II and III. The liquid chloroethyl dichlorobenzenes were heated to a temperature of 365–370° C. to vaporize them and the catalyst, occupying a space of 113 ml., was thereby held at 315–320° C. The feed rate to the vaporizer was 1 ml. per minute and the operating pressure was 12 mm. of mercury absolute. The product had a refractive index of 1.5769 to 1.5782, an iodine value of 110.3 and a side chain chlorine content of 3.87, representing a dichlorostyrene content of about 75–77%. On fractionation of a sample of the product at 2–3 mm. pressure in the presence of 0.5% of ditertiary butyl hydroquinone, 1.2% of ditertiary butyl catechol and 0.7% of diamylhydroquinone as inhibitors, only about 1% of material lower boiling than the dichlorostyrenes was found to be present.

Example V

Sufficient water was added to a 95:5 mixture of shredded commercial asbestos and magnesium chloride dihydrate to form a paste. The paste was extruded, cut into pellets and the pellets fired for two hours at 400° C. When mixed chloroethyl dichlorobenzenes were passed over the catalyst thus prepared, the conditions being the same as in the preceding example, the conversion to dichlorostyrenes was of the order of 78–81%. The product contained not more than 1.5% of materials lower boiling than dichlorostyrenes.

Example VI

The catalyst was prepared as in the preceding example except that twice as much magnesium chloride dihydrate was used. The magnesium chloride acts as a promoter. The dehydrochlorination was carried out at the same rate and conditions of temperature and pressure as described in Example IV and yielded a product made up of fractions showing refractive indices of from 1.5765 to 1.5800. The product had an iodine value of 114.9 and a side chain chlorine content of 3.04% corresponding to a dichlorostyrene content of from 78.4 to 82%. On analytical distillation the first drop of distillate had a refractive index of 1.5775 and the second drop had a refractive index of 1.5780. This corresponds to less than 0.25% of objectionable low boiling materials.

Example VII

The catalyst in this instance was prepared from a mixture of 90% asbestos, 5% magnesium chloride dihydrate and 5% of anhydrous calcium chloride made to a paste with a minimum of water, extruded and fired as described in Example V. The product from the dehydrochlorination of mixed chloroethyl dichlorobenzenes, under the conditions of Example IV, had an iodine value of 115.7 and a side chain chlorine content of 3.19 corresponding to about 79–81% of dichlorostyrenes. On analytical distillation less than 1.25% of materials lower boiling than dichlorostyrenes were found.

*Example VIII*

The catalyst was prepared from a mixture of 85% of asbestos, 5% of magnesium chloride dihydrate and 10% of anhydrous calcium chloride. The dehydrochlorination was carried out under the conditions of Example IV and gave a product made up of fractions having indices between 1.5768 and 1.5782. The product had an iodine value of 111.2 and a side chain chlorine content of 3.55 corresponding to about 76–79% of dichlorostyrenes. Low boiling impurities amounted to slightly more than 1%.

*Example IX*

The catalyst was prepared from a mixture of 90% of asbestos, 5% of magnesium chloride dihydrate and 5% of an equimolecular mixture of zinc, chromium and cobalt nitrates converted to oxides on firing for two hours at 400° C. Carrying out the dehydrochlorination as described in Example IV, samples of the product taken as the reaction progressed showed refractive indices of 1.5772 to 1.5805. The producct had an iodine value of 117.9, and a side chain chlorine content of 2.93 corresponding to a dichlorostyrene content of 81–83%. About 4% of low boiling compounds were present in the product.

Used in a further run involving a total charge of 290 ml. of chloroethyl dichlorobenzenes, the catalyst without prior reactivation gave a conversion to dichlorostyrenes of 74–75%.

*Example X*

The catalyst of Example IX was used in dehydrochlorinating a mixture of alpha and beta chloroethyl-2, 6-dichlorobenzenes, the mixture being essentially free of other isomers. The charge, having a volume of 45–55 ml., was introduced at a rate of 0.75 ml. of liquid per minute and the pressure was maintained at 10 mm. absolute. During vaporization the charge was preheated to 420–425° C. The catalyst temperature varied between 370–375° C. The index of refraction of the product varied from 1.5685 to 1.5710, corresponding to a dichlorostyrene content of about 60 to 80 per cent.

The catalyst was repeatedly reactivated and reused to dehydrochlorinate additional 45–55 ml. charges of the chloroethyl dichlorobenzenes until a total of 710 ml. of product was realized from a total charge of 860 ml. On distillation of the crude product under a pressure of 6 mm. in the presence of ditertiary butyl-hydroquinone and ditertiary butylcatechol, pure 2,6-dichlorostyrene having a refractive index of 1.5729 was obtained.

*Example XI*

The catalyst was unpromoted, being simply shredded commercial asbestos. Using this catalyst under the conditions of the run described in Example IV, the indices of refraction of the fractions making up the product varied from 1.5760 to 1.5770. The product had an iodine value of 98.8 and a side chain chlorine content of 5.18 corresponding to a dichlorostyrene content of 67–70%. About 1% of low boiling compounds were found present on analytical distillation.

As demonstrated by the examples, the catalysts of this invention are remarkably effective in promoting dehydrochlorination of chloroethyl dichlorobenzenes to the desired dichlorostyrenes. Also, as demonstrated, the catalysts are quite long lived, being capable of dehydrochlorinating surprisingly large amounts of charge material without substantial loss of activity from repeated reactivations.

My invention is not limited to the dehydrochlorination of chloroethyl dichlorobenzenes but is generally applicable to dehydrohalogenation reactions where the halogen to be removed is attached to a side chain of an aromatic nucleus. Thus, it may be applied, for example, to the dehydrohalogenation of bromoethyl benzene or other haloalkyl benzenes which are not halo substituted in the nucleus, or it may be applied to the dehydrohalogenation of haloalkyl aromatic compounds, such as, chloroethyl- or bromoethyl- ethylbenzene comprising an alkyl side chain free of halo substituents.

I claim:

In the treatment of a chloroethyl dichlorobenzene to produce the corresponding dichlorostyrene, the method which comprises contacting the chloroethyl dichlorobenzene with a catalytic amount of asbestos under a pressure of the order of 10–15 mm. of mercury absolute at a temperature between 300–400° C., the asbestos having in admixture therewith minor amounts of an alkaline earth metal halide and of oxides of zinc, chromium and cobalt.

EDWIN R. ERICKSON.

REFERENCES CITED

The following references are of record in the file of this patent:

UNITED STATES PATENTS

| Number | Name | Date |
|---|---|---|
| 2,363,011 | Michalek et al. | Nov. 21, 1944 |
| 2,368,446 | Buc | Jan. 30, 1945 |

FOREIGN PATENTS

| Number | Country | Date |
|---|---|---|
| 559,737 | Germany | Sept. 23, 1932 |

Certificate of Correction

Patent No. 2,519,125                                               August 15, 1950

EDWIN R. ERICKSON

It is hereby certified that error appears in the printed specification of the above numbered patent requiring correction as follows:

Column 1, line 40, for "chlorobenzes" read *chlorobenzenes*; line 46, for "viscouse" read *viscous*; column 3, line 66, for "1.5518" read *1.5818*; column 5, line 30, for "producct" read *product*;

and that the said Letters Patent should be read as corrected above, so that the same may conform to the record of the case in the Patent Office.

Signed and sealed this 24th day of October, A. D. 1950.

[SEAL]

THOMAS F. MURPHY,
                                                                               *Assistant Commissioner of Patents.*